United States Patent
Indyk et al.

(10) Patent No.: US 10,623,573 B2
(45) Date of Patent: *Apr. 14, 2020

(54) PERSONALIZED SUPPORT ROUTING BASED ON PARALINGUISTIC INFORMATION

(71) Applicant: INTUIT INC., Mountain View, CA (US)

(72) Inventors: Benjamin Indyk, San Diego, CA (US); Igor A. Podgorny, San Diego, CA (US); Raymond Chan, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/564,462

(22) Filed: Sep. 9, 2019

(65) Prior Publication Data

US 2020/0007687 A1 Jan. 2, 2020

Related U.S. Application Data

(63) Continuation of application No. 16/177,510, filed on Nov. 1, 2018, now Pat. No. 10,412,223, which is a (Continued)

(51) Int. Cl.
*H04M 3/00* (2006.01)
*H04M 5/00* (2006.01)
(Continued)

(52) U.S. Cl.
CPC ............ *H04M 3/5235* (2013.01); *G10L 15/02* (2013.01); *G10L 15/14* (2013.01); *G10L 25/63* (2013.01);
(Continued)

(58) Field of Classification Search
CPC ............ H04M 3/5175; H04M 3/5232; H04M 2203/402; H04M 3/5233; H04M 2201/40; H04M 2201/39
(Continued)

(56) References Cited

U.S. PATENT DOCUMENTS

| 5,640,485 A | 6/1997 | Ranta |
| 6,393,505 B1 | 5/2002 | Scalise et al. |

(Continued)

OTHER PUBLICATIONS

D Verma and D. Mukhopadhyay, "Age driven automatic speech emotion recognition system," 2016 International Conference on Computing, Communication and Automation (ICCCA), Noida, 2016, pp. 1005-1010.
(Continued)

*Primary Examiner* — Thjuan K Addy
(74) *Attorney, Agent, or Firm* — Patterson + Sheridan, LLP

(57) ABSTRACT

Embodiments presented herein provide techniques for inferring the current emotional state of a user based on paralinguistic features derived from audio input from that user. If the emotional state meets triggering conditions, the system provides the user with a prompt which allows the user to connect with a support agent. If the user accepts, the system selects a support agent for the user based on the predicted emotional state and on attributes of the support agent found in an agent profile. The system can also determine a priority level for the user based on the score and based on a profile of the user and determine where to place the user in a queue for the support agent.

20 Claims, 7 Drawing Sheets

Related U.S. Application Data continuation of application No. 15/336,521, filed on Oct. 27, 2016, now Pat. No. 10,135,989.

(51) Int. Cl.
| | | |
|---|---|---|
| *H04M 1/64* | (2006.01) | |
| *H04M 3/523* | (2006.01) | |
| *H04M 3/42* | (2006.01) | |
| *G10L 15/02* | (2006.01) | |
| *G10L 15/14* | (2006.01) | |
| *G10L 25/63* | (2013.01) | |

(52) U.S. Cl.
CPC ..... *H04M 3/42068* (2013.01); *H04M 3/5233* (2013.01); *H04M 2201/40* (2013.01); *H04M 2203/2038* (2013.01)

(58) Field of Classification Search
USPC .............. 379/265.13, 88.01, 265.11, 265.12, 379/265.05, 265.01, 266.01
See application file for complete search history.

(56) References Cited

U.S. PATENT DOCUMENTS

| | | | |
|---|---|---|---|
| 6,584,180 | B2 | 6/2003 | Nemoto |
| 7,203,635 | B2 | 4/2007 | Oliver et al. |
| 7,778,831 | B2 | 8/2010 | Chen |
| 8,010,358 | B2 | 8/2011 | Chen |
| 8,050,922 | B2 | 11/2011 | Chen |
| 8,429,106 | B2 | 4/2013 | Downs et al. |
| 8,531,501 | B2 | 9/2013 | Portman et al. |
| 8,676,586 | B2 | 3/2014 | Wasserblat et al. |
| 8,700,396 | B1 | 4/2014 | Mengibar et al. |
| 8,756,057 | B2 | 6/2014 | Miller et al. |
| 8,837,706 | B2 | 9/2014 | Odinak et al. |
| 8,909,771 | B2 | 12/2014 | Heath |
| 8,949,132 | B2 | 2/2015 | Bangalore et al. |
| 9,230,562 | B2 | 1/2016 | Miller et al. |
| 9,269,374 | B1 | 2/2016 | Conway et al. |
| 9,336,268 | B1 | 5/2016 | Moudy et al. |
| 9,661,130 | B2 | 5/2017 | Feast et al. |
| 9,685,152 | B2 | 6/2017 | Matsubara et al. |
| 9,818,406 | B1 | 11/2017 | Chan |
| 10,135,989 | B1 | 11/2018 | Indyk et al. |
| 2002/0135618 | A1 | 9/2002 | Maes et al. |
| 2003/0028384 | A1 | 2/2003 | Kemp et al. |
| 2003/0088832 | A1 | 5/2003 | Agostinelli et al. |
| 2003/0229492 | A1 | 12/2003 | Nolan |
| 2004/0030750 | A1 | 2/2004 | Moore et al. |
| 2006/0095265 | A1 | 5/2006 | Chu et al. |
| 2006/0095267 | A1 | 5/2006 | Yano et al. |
| 2006/0122840 | A1 | 6/2006 | Anderson et al. |
| 2006/0293892 | A1 | 12/2006 | Pathuel |
| 2007/0113181 | A1 | 5/2007 | Blattner et al. |
| 2007/0198264 | A1 | 8/2007 | Chang |
| 2008/0096533 | A1 | 4/2008 | Manfredi et al. |
| 2008/0103761 | A1 | 5/2008 | Printz et al. |
| 2008/0189096 | A1 | 8/2008 | Apte et al. |
| 2008/0195389 | A1 | 8/2008 | Zhang et al. |
| 2009/0100050 | A1 | 4/2009 | Erol et al. |
| 2009/0258333 | A1 | 10/2009 | Yu |
| 2009/0259648 | A1 | 10/2009 | Bokor et al. |
| 2010/0037187 | A1 | 2/2010 | Kondziela |
| 2010/0070276 | A1 | 3/2010 | Wasserblat et al. |
| 2010/0131272 | A1 | 5/2010 | Wu |
| 2011/0184721 | A1 | 7/2011 | Subramanian et al. |
| 2012/0016678 | A1 | 1/2012 | Gruber et al. |
| 2012/0089396 | A1 | 4/2012 | Patel et al. |
| 2013/0016815 | A1 | 1/2013 | Odinak |
| 2013/0016823 | A1 | 1/2013 | Odinak et al. |
| 2013/0241952 | A1 | 9/2013 | Richman et al. |
| 2013/0262096 | A1 | 10/2013 | Wilhelms-Tricarico et al. |
| 2013/0274015 | A1* | 10/2013 | Bill ....................... G06F 17/289 463/31 |
| 2015/0003605 | A1 | 1/2015 | Odinak et al. |
| 2015/0019216 | A1 | 1/2015 | Singh et al. |
| 2015/0127343 | A1 | 5/2015 | Mullor et al. |
| 2015/0170053 | A1 | 6/2015 | Miao |
| 2015/0234636 | A1 | 8/2015 | Barnes, Jr. |
| 2015/0281445 | A1 | 10/2015 | Kumar et al. |
| 2015/0294669 | A1 | 10/2015 | Zhang et al. |
| 2016/0021250 | A1 | 1/2016 | Kumar et al. |
| 2016/0071517 | A1 | 3/2016 | Beaver et al. |
| 2016/0104486 | A1 | 4/2016 | Penilla et al. |
| 2016/0217472 | A1 | 7/2016 | Podgorny et al. |
| 2016/0379638 | A1 | 12/2016 | Basye et al. |
| 2017/0068551 | A1 | 3/2017 | Vadodaria |
| 2017/0110111 | A1 | 4/2017 | Matsubara et al. |
| 2017/0125008 | A1 | 5/2017 | Maisonnier et al. |
| 2017/0195491 | A1 | 7/2017 | Odinak |
| 2017/0257481 | A1 | 9/2017 | Feast et al. |

OTHER PUBLICATIONS

Carlos Toshinori Ishi; Hiroshi Ishiguro; Norihiro Hagita. "Evaluation of Prosodic and Voice Quality Features on Automatic Extraction of Paralinguistic Information." 2006 IEEE/RSJ International Conference on Intelligent Robots and Systems; Year: 2006 pp. 374-379, DOI: 1 0.11 09/I ROS.2006.281786.

Sudeep Galgali; S Selva Priyanka; B. R. Shashank; Annapurna P Patil. "Speaker profiling by extracting paralinguistic parameters using mel frequency cepstral coefficients" 2015 International Conference on Applied and Theoretical Computing and Communication Technology (iCATccT). pp. 486-489, DOI: 10.1109/ICATCCT.2015. 7456933.

* cited by examiner

PERSONALIZED SUPPORT ROUTING BASED ON PARALINGUISTIC INFORMATION

CROSS-REFERENCE TO RELATED APPLICATIONS

This application is a continuation of pending U.S. patent application Ser. No. 16/177,510, filed on Nov. 1, 2018, which is a continuation of U.S. patent application Ser. No. 15/336,521, filed on Oct. 27, 2016, and issued on Nov. 20, 2018, as U.S. Pat. No. 10,135,989, both of which are herein incorporated by reference in their entirety.

BACKGROUND

Field

Embodiments of the present invention generally relate to systems for providing support to application users. More specifically, embodiments presented herein provide techniques for routing users to support agents based on paralinguistic features of audio input received from the users.

Description of the Related Art

Many modern software applications are designed to be as user-friendly as possible. However, users who are unfamiliar with an application interface or functionality often need some assistance to navigate through the application, perform desired tasks, or find answers to general questions. If a user fails to find assistance quickly enough, the user may abandon using the application. In this way, a software vendor can lose current or potential customers by failing to provide adequate support.

To provide support, some software vendors employ support agents who are trained to assist customers with common problems. These support agents may communicate with customers via messaging windows or via telephone. Experience levels, language skills, personality types, voice qualities, call-time efficiency, and other attributes vary from one support agent to another. Technical sophistication, personality, and patience also vary from one customer to another. The support issues faced by such agents can also vary widely from encounter to encounter. This variation can lead to very different experiences for customers who contact support agents. For example, a new agent may be able to help a patient customer who speaks clearly with a relatively simple issue, but may struggle to help an irate customer with limited communication skills resolve a complicated or unusual issue. A more experienced agent, however, may be able to calm the irate customer down and resolve the issue relatively quickly, thereby making it more likely that the customer will continue to use the application.

Support agents typically work in one or more call centers. Typically, a computing system routes calls to support agents based on agent availability, agent skills, and the phone line through which the calls arrive. For example, if a customer dials a telephone number for billing support in French, the computing system searches through stored agent profiles to identify an available support agent who speaks French and has been trained to provide billing support. The computing system routes the call to the available support agent. If no support agents with matching skills are available, the computing system places the call into a queue. The customer waits on hold in the queue until the call is answered by the next available qualified support agent.

SUMMARY

One embodiment disclosed herein includes a method for using paralinguistic features to determine whether to present customer assistance information to a user of an application. The method generally includes receiving audio input from the user interacting with the application; extracting a set of paralinguistic features from the audio input, wherein the paralinguistic features characterize acoustic aspects of the audio input distinct from verbal content; predicting, from the paralinguistic features, an emotional state of the user using a predictive model; and upon determining the emotional state satisfies one or more specified conditions, presenting a prompt inviting the user to communicate with a support agent.

Another embodiment includes non-transitory computer-readable storage medium containing instructions that, when executed by one or more processors, perform an operation for using paralinguistic features to determine whether to present customer assistance information to a user of an application. The operation generally includes receiving audio input from the user interacting with the application; extracting a set of paralinguistic features from the audio input, wherein the paralinguistic features characterize acoustic aspects of the audio input distinct from verbal content; predicting, from the paralinguistic features, an emotional state of the user using a predictive model; and upon determining the emotional state satisfies one or more specified conditions, presenting a prompt inviting the user to communicate with a support agent.

Still another embodiment includes a processor and a memory storing one or more applications that, when executed on the processor, performs an operation for using paralinguistic features to determine whether to present customer assistance information to a user of an application. The operation generally includes receiving audio input from the user interacting with the application; extracting a set of paralinguistic features from the audio input, wherein the paralinguistic features characterize acoustic aspects of the audio input distinct from verbal content; predicting, from the paralinguistic features, an emotional state of the user using a predictive model; and upon determining the emotional state satisfies one or more specified conditions, presenting a prompt inviting the user to communicate with a support agent.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Embodiments presented herein provide techniques for selecting an agent to whom a user is routed for assistance based on paralinguistic features of audio input received from the user. For example, in one embodiment, a user utters commands processed by a software application. A feature extractor identifies paralinguistic features characterizing the audio input. A predictive model (e.g., a machine-learning model) uses the paralinguistic features to determine a score representing a predicted emotional state of the user. A support routing module selects a support agent to assist the user based on the score and based on a profile of the support agent.

For example, the support routing module can compare a profile of the support agent to a threshold level for the attribute that is associated with the score in a mapping and select the support agent based on the comparison. The attribute may be an experience level of the agent, an average customer-satisfaction level for customers the agent assists, or an average score change (e.g., indicating change in emotional state) of customers the agent assists. If a profile for the user is available, the support routing module may also compare the user profile to the agent profile and base the selection on the comparison.

Note embodiments described herein using a software application used to manage financial information or accounts as a reference example. Of course one of skill in the art will readily recognize embodiments may be adapted for other types of software applications.

Figure 1:
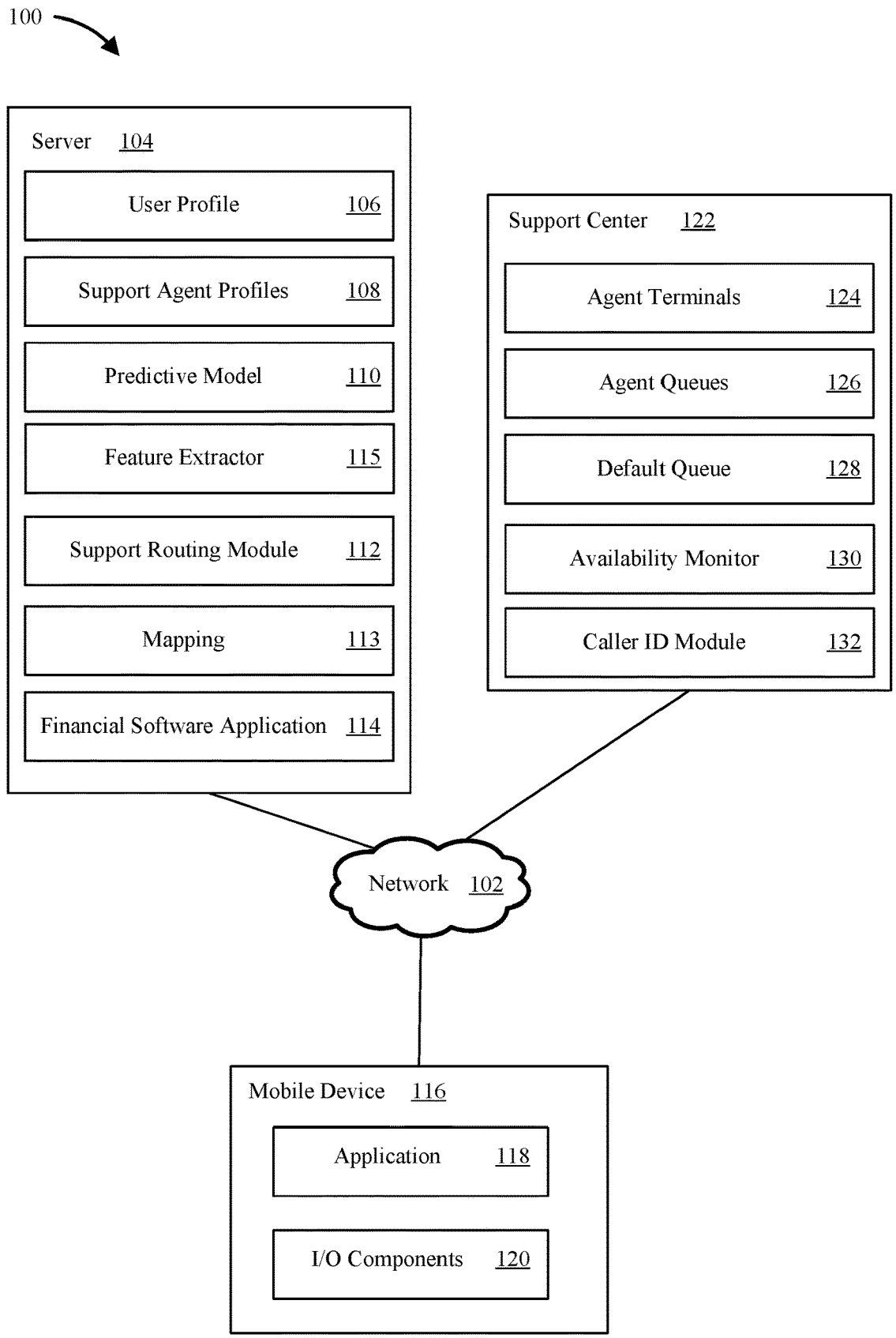
FIG. 1 illustrates a computing environment in which systems for routing calls based on paralinguistic features may operate, according to one embodiment.

FIG. 1 illustrates a computing environment 100 in which systems for routing calls based on paralinguistic features may operate, according to one embodiment. A server 104, a mobile device 116, and a support center 122 are connected to a network 102. Through an application 118 on the mobile device 116, a user interacts with a financial software application 114 executing on the server 104. In some embodiments, application 118 is a client interacting with the financial software application 114 on the server 104. The financial software application 114 may provide tax preparation, personal financial management, or other types of financial services. The application 118 may be a browser or a stand-alone client used to access services provided by the financial software application 114.

The user communicates with the application 118 using input/output (I/O) components 120. I/O components 120 include a microphone, a speaker, and a touch screen. The microphone of the I/O components 120 can capture audio input for the application 118. For example, application 118 may support spoken commands, requests, or other verbal statements to the application 118. The application 118 sends the audio input captured by the microphone to the server 104.

The feature extractor 115 extracts paralinguistic features from the audio input. The predictive model 110 (e.g., machine-learning model) receives the paralinguistic features from the feature extractor 115 and determines a score for the user. The score can represent an emotional state of the user as inferred by the predictive model 110 based on the paralinguistic features. For example, the score may be a real number ranging from −1 (a very negative emotional state) to 1 (very positive emotional state).

Paralinguistic technically means "alongside linguistics" and therefore deals with phenomena that are modulated onto or embedded into the audio input and are distinct from verbal content (i.e., the actual words that are spoken). For example, some of the paralinguistic features may be low level descriptors that are extracted from frames of the audio stream (e.g., 10-30 millisecond frames). These acoustic low level descriptors may include intonation (pitch, etc.), intensity (energy, Taeger functions, etc.), linear prediction cepstral coefficients (LPCC), perpetual linear prediction (PLP) parameters, cepstral coefficients (Mel frequency cepstral coefficients (MFCCs), etc.), formants (amplitude, position, width, dispersion, etc.), spectrum (Mel frequency bands (MFB), NMF-based components, MPEG-7 audio spectrum projection, roll-off, etc.), TF transformation (wavelets, Gabor, etc.), harmonicity (harmonics-to-noise ratio (HNR), noise-to-harmonics ratio (NHR), etc.), and/or perturbation (jitter, shimmer, etc.). Further, the paralinguistic features may include low level descriptors such as phoneme sequences, non-linguistic strings (laughter, sighs, etc.), and/or disfluencies (false starts, filled/unfilled pauses, etc.). The paralinguistic features may also include fundamental frequency, volume, and other measurable characteristics of the audio input. The paralinguistic information may be extracted utilizing software such as EmoVoice, OpenEar, Yaafe, Voice Search DB with Accent and Tone, VoiceVault, AT&T APis, etc.

The support routing module 112 compares the score to a threshold score. The threshold score may be a predetermined global value that applies to all users. Alternatively, the threshold score may be a user-specific value that is a function of attributes included in the user profile 106. Examples of attributes in the user profile 106 include the user's age, the amount of money the user has spent using the services of the financial software application 114, the user's income, the number of times the user has previously received assistance from support agents, and the length of time that the user has been a customer of the financial software application 114. In one example, the threshold score may be defined as:

$$\frac{1}{F} \cdot \sum_{i=1}^{k} W_i \cdot A_i$$

where k refers to an integer number of attributes in the user profile 106, i is an integer index ranging from 1 to k, $A_i$ refers to the value of the ith attribute in the user profile 106, $W_i$ refers to a predefined weight for $A_i$, and F is a scale factor (e.g., used to ensure the possible range of threshold scores is the same size as the range of possible score values).

If the predictive model 110 determines a score for the user meets a threshold, the support routing module 112 infers that live assistance from a support agent should be provided to the user. Once the support routing module 112 determines that the score (as determined based on the paralinguistic features) meets the threshold score, the support routing module 112 provides the user with a prompt offering help from a support agent. The prompt may allow the user to communicate with a support agent through a messaging window or through a voice connection (e.g., telephone). In one example, the prompt may provide a button that the user selects to open a messaging window with an agent or to initiate a voice chat with an agent via the network 102. In another example, the user can request that a support agent call the user at a specified telephone number (e.g., of the mobile device 116).

In another example, the prompt may also provide a telephone support number (e.g., associated with the support center 122) for the user to call. The application 118 may send the telephone number of the mobile device 116 to the support routing module 112. In addition, the support routing module may identify any other telephone numbers associated with the user profile 106. The prompt may also allow the user to specify a phone number from which the user will call. When the user calls the telephone support number from any telephone number associated with the user, the caller identification (ID) module 132 notifies the support routing module 112. The support routing module 112 detects that the user has accepted the prompt based on the notification.

Provided the user selects to communicate with an agent, the support routing module 112 compares the score for the user to a mapping 113. The mapping 113 associates scores with experience levels, customer-satisfaction levels, or levels of other attributes found in the support agent profiles 108. For example, a score indicating that the customer is in a negative emotional state may result in the support routing module 112 routing the call to a an experienced support agent, or one with a history of favorable outcomes for support encounters initiated with such customers. The support routing module 112 identifies the attribute levels that correspond to the score in the mapping 113. The attribute levels to which the score maps serve as baselines for selecting a support agent to assist the user. The support routing module 112 compares the attribute levels to the support agent profiles 108 to identify a set of support agents who meet (or exceed) the attribute levels. Furthermore, in one embodiment, the support routing module 112 also determine appropriate areas of expertise (e.g., tax law expertise, expertise with the inner workings of the financial software application 114, or expertise with a specific language) based on additional context. The additional context may include a telephone number dialed for support, a user-provided description of the issue for which the user seeks assistance, or a page of the financial software application 114 currently loaded in the application 118. For example, the support routing module 112 may determine that a user-provided description of the issue suggests the user needs an agent who understands income tax law for a specific jurisdiction. The support routing module 112 can ensure that only agents with this particular expertise are included in the set of support agents. The support routing module 112 then indicates the set of support agents to the availability monitor 130.

For each agent in the set, the availability monitor 130 determines how many customers are currently waiting in the corresponding agent queue of the agent queues 126. If there are multiple agents in the set (i.e., multiple agents who meet the attribute levels to which the score for the user maps in the mapping 113), the support routing module 112 can add the user to the agent queue that currently has the smallest number of customers. If there is only one agent in the set, the support routing module 112 adds the user to the agent queue corresponding to that agent. If all or none of the agents that are currently working at agent terminals 124 are in the set, the support routing module can add the user to the default queue.

Support agent profiles 108 include attributes of support agents that work at agent terminals 124 at a support center 122. For each agent working at one of the agent terminals 124, there is a corresponding agent queue in the agent queues 126. When an agent becomes available to assist a customer, a call for the next customer in the corresponding agent queue is transferred to the corresponding agent. A customer may be placed at a position in the agent queue that is determined based on the customer's value or priority level. For example, an angry customer who uses a free version of the financial software application 114 may be placed behind a mildly frustrated customer who uses an expensive version because the latter customer may be considered more valuable. If no customers are in the corresponding agent queue, the agent serves the next customer in the default queue.

Each of the support agent profiles 108 may include many agent attributes, such as experience level, language skills, specialized training, age, personality type, gender, voice quality, typing speed. In addition, each of the support agent profiles 108 can include a customer-satisfaction attribute that quantifies satisfaction levels of customers who the agent assists. This customer-satisfaction attribute can be based on explicit customer feedback (e.g., in surveys that ask customers to rate their satisfaction after being assisted by agents). The customer-satisfaction attribute can also be based on implicit indicators of customer satisfaction, such as whether a customer continues to use the financial software application 114 after being assisted by an agent.

Depending on the mode of communication selected by the user, the user may be placed in the agent queue in one of several ways. For example, if the user selected to call a telephone support number, the support routing module 112 places the incoming call from the user in the agent queue. If the user selected to communicate with a support agent via a messaging window, the support routing module 112 places an instant-messaging connection with the user in the agent queue. If the user selected to have an agent call the user, the support routing module 112 inserts a placeholder for the user in the agent queue. When the support agent reaches the placeholder in the queue, a telephone associated with the agent terminal where the support agent is working automatically dials the telephone number provided by the user.

By default, the agent queues 126 operate on a first-in, first-out basis. However, the support routing module 112 can also sort customers in the agent queues 126 by score so that customers with scores indicating greater negative emotional states are given priority. In another embodiment, the support routing module 112 can sort customers in the agent queues 126 according to a priority level that depends on both profile information (e.g., as found in user profile 106) and score. In one example, the priority level for the user may be defined as:

$$S + \sum_{j=1}^{x} \alpha_j \cdot A_j$$

where x refers to an integer number of attributes in the user profile 106, j is an integer index ranging from 1 to x, $A_j$ refers to the value of the jth attribute in the user profile 106, $\alpha_j$ refers to a predefined priority-level weight for $A_j$, and S is the score for the user.

Figure 2:
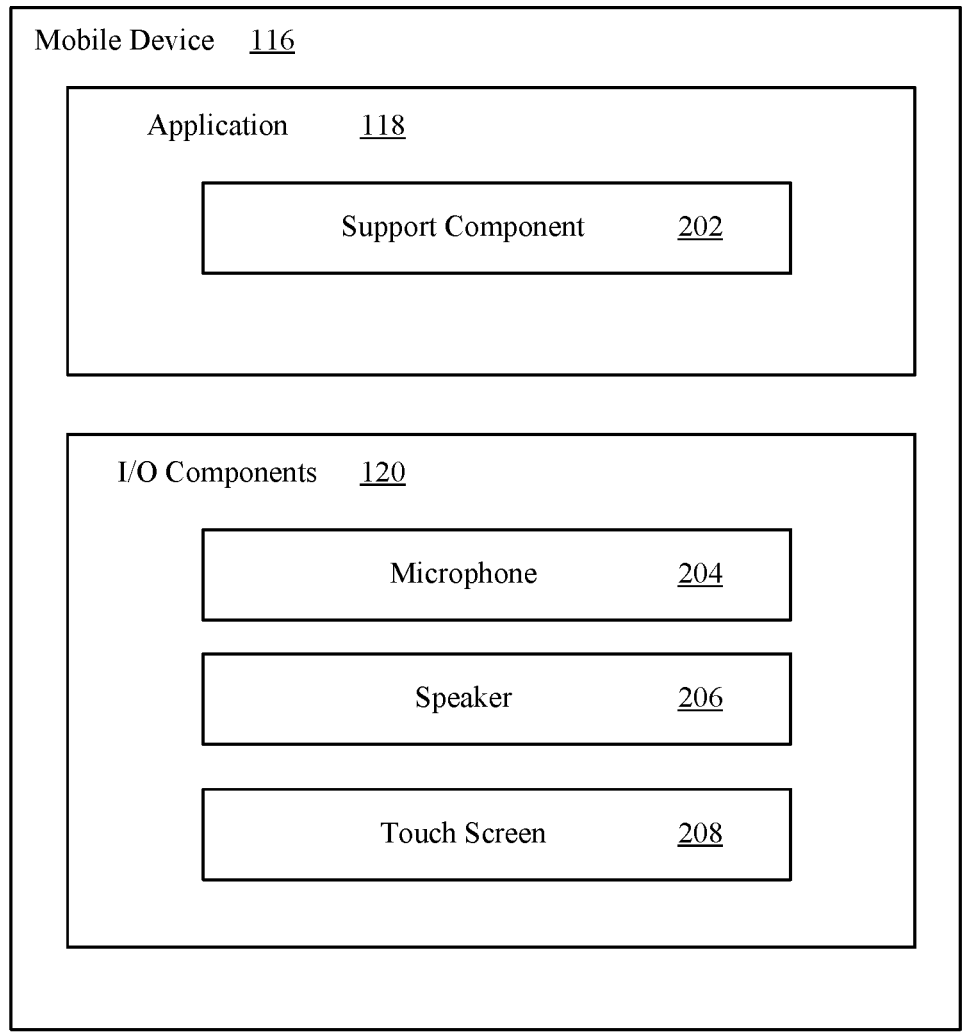
FIG. 2 illustrates a detailed view of a mobile device that can be used with systems of the present disclosure, according to one embodiment.

FIG. 2 illustrates a detailed view of the mobile device 116, according to one embodiment. As shown, the application 118 includes a support component 202. The I/O components 120 include a microphone 204, a speaker 206, and a touch screen 208. The application 118 presents output to the user via the touch screen 208 and or the speaker 206. The application 118 can also receive user input via the touch screen 208.

The microphone 204 receives audio input from the user. The audio input may include any sound the microphone 204 can detect, such as voice commands or spoken data supplied to the application 118.

The support component 202 can transmit audio input to a server (e.g., server 104) for analysis. At the server, a predictive model determines a score using paralinguistic features characterizing the audio input. If the score meets a threshold, the support component 202 may present a dialog (or other interface component) informing the user of an option to communicate with a support agent. If the option is accepted, the support component 202 may display an instant-messaging window for the user to communicate with a support agent. Alternatively, the support component 202 may display a telephone number for the user to call to speak with a support agent. The support component 202 may also send a phone number of the mobile device 116 to the server so that an incoming call from the user to a support center can be identified. In another example, the support component 202 may also call the user. The support component 202 may also activate a voice chat feature of application 118 to enable the user to communicate with a support agent.

Figure 3:
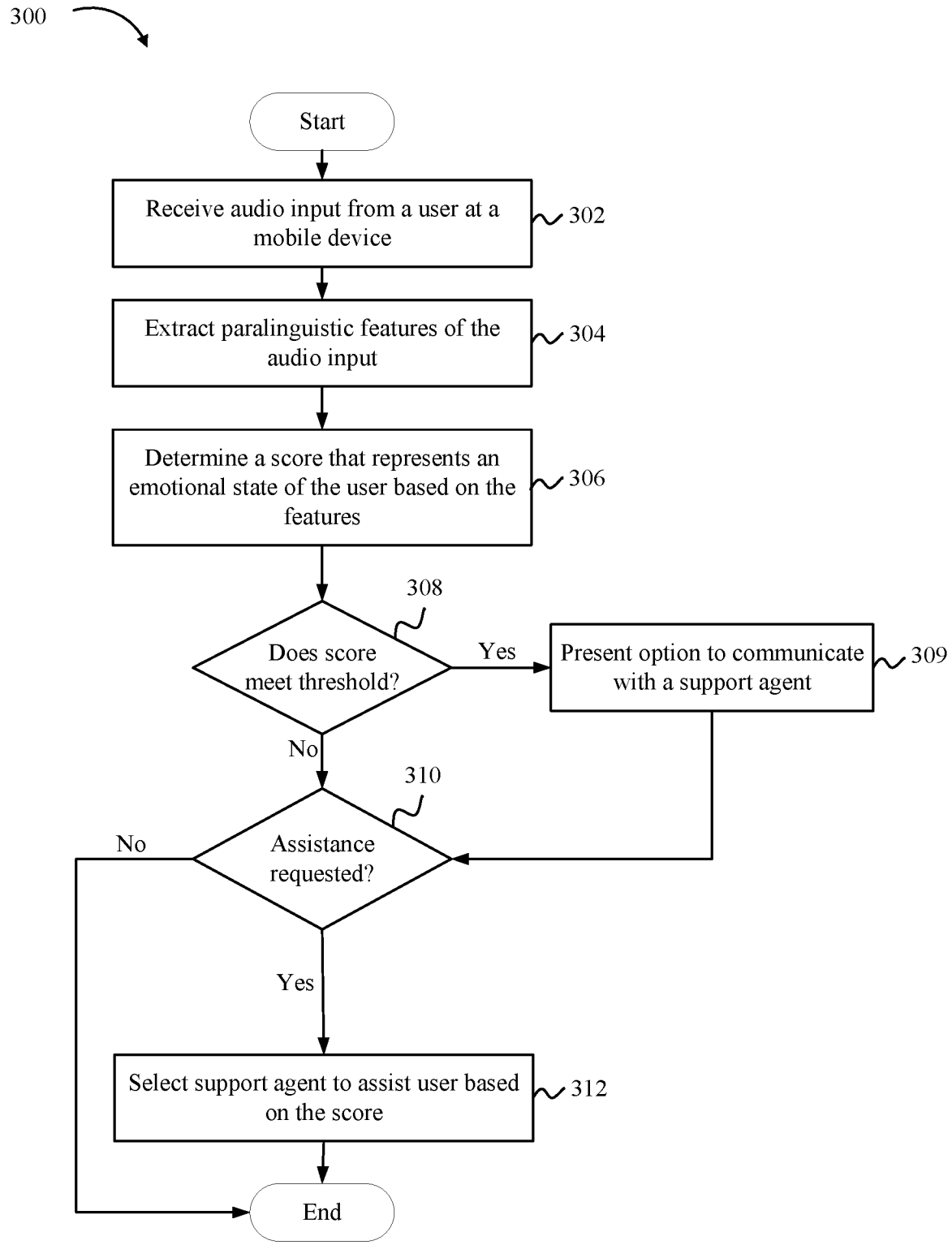
FIG. 3 illustrates a method for providing support for a financial application, according to one embodiment.

FIG. 3 illustrates a method 300 for providing support for an application, according to one embodiment. At step 302, a mobile device receives audio input from a user via a microphone. At least some of the audio input corresponds to sound of the user, including spoken words, sighs, laughter, grunts, or breaths. The user may provide the audio input while verbally interacting with one or more screens or pages of an application interface (e.g., shown in a browser).

At step 304, a feature extractor identifies paralinguistic features of the audio input. Paralinguistic technically means "alongside linguistics" and therefore deals with phenomena that are modulated onto or embedded into the audio input. For example, some of the paralinguistic features may be low level descriptors that are extracted from frames of the audio stream (e.g., 10-30 millisecond frames). These acoustic low level descriptors may include intonation (pitch, etc.), intensity (energy, Taeger functions, etc.), linear prediction cepstral coefficients (LPCC), perpetual linear prediction (PLP) parameters, cepstral coefficients (Mel frequency cepstral coefficients (MFCCs), etc.), formants (amplitude, position, width, dispersion, etc.), spectrum (Mel frequency bands (MFB), NMF-based components, MPEG-7 audio spectrum projection, roll-off, etc.), TF transformation (wavelets, Gabor, etc.), harmonicity (harmonics-to-noise ratio (HNR), noise-to-harmonics ratio (NHR), etc.), and/or perturbation (jitter, shimmer, etc.). Further, the paralinguistic features may include low level descriptors such as phoneme sequences, non-linguistic strings (laughter, sighs, etc.), and/or disfluencies (false starts, filled/unfilled pauses, etc.). The paralinguistic features may also include fundamental frequency, volume, and other measurable characteristics of the audio input. The paralinguistic information may be extracted utilizing software such as EmoVoice, OpenEar, Yaafe, Voice Search DB with Accent and Tone, VoiceVault, AT&T APIs, etc.

At step 306, a predictive model determines a score predicting an emotional state (or measures of different emotional states) of the user based on the paralinguistic features. For example, a machine-learning model may be trained to predict an emotional state based on paralinguistic features. There are many different types of inductive and transductive machine-learning models that can be used for the predictive model. Examples of machine-learning models include adsorption models, neural networks, support vector machines, radial basis functions, Bayesian belief networks, association-rule models, decision trees, instance-based models (e.g., k-NN), regression models, Hopfield networks, deep belief networks, and Q-learning models.

Many configurations and parameter combinations may be possible for a given type of machine-learning model. With a neural network, for example, the number of hidden layers, the number of hidden nodes in each layer, and the existence of recurrence relationships between layers can vary. True gradient descent or stochastic gradient descent may be used in the process of tuning weights. The learning rate parameter, which partially determines how much each weight may be adjusted at each step, may be varied. Input features may be normalized. Other parameters that are known in the art, such as momentum, may also be applied to improve neural network performance. In another example, decision trees can be constructed using a variety of approaches. Some non-limiting examples include the iterative dichotomiser 3 (ID3), Classification and Regression Tree (CART), and CHi-squared Automatic Interaction Detection (CHAID) methods. These methods may use one or more different metrics to determine the order in which attribute values are examined in decision trees. Some non-limiting examples of such metrics include information gain and Gini impurity. In addition, pruning methods may be applied to improve decision tree performance. Some non-limiting examples of pruning techniques include reduced error pruning, cost complexity pruning, and alpha-beta pruning.

Furthermore, individual machine learning models can be combined to form an ensemble machine-learning model. An ensemble machine-learning model may be homogenous (i.e., using multiple member models of the same type) or non-homogenous (i.e., using multiple member models of different types). Individual machine-learning models within an ensemble may all be trained using the same training data or may be trained using overlapping or non-overlapping subsets randomly selected from a larger set of training data.

At step 308, a support routing module compares the score to a threshold score. The threshold score may apply to all users (or groups of users). In other cases, the threshold score may be a user-specific value determined using attributes about that user. If the score does not meet the threshold score, the support routing module determines whether the user has requested assistance (thereby proceeding to step 310).

Otherwise, at step 309, the support routing module presents a prompt to communicate with a support agent to the user (e.g., via a display on the mobile device). The prompt may appear to the user in a header bar, a side bar, a pop-up window, or a dialog box. The prompt may present a button the user can select to open a messaging window with an agent or to initiate an Internet telephony connection with an agent. The prompt may also allow the user to request that a support agent call the user at a specified telephone number.

The prompt may also provide a telephone support number for the user to call to communicate with an agent.

At step 310, the support routing module determines whether the user has requested assistance. For example, the user can accept the prompt (e.g., by clicking on a button). Alternatively, the user can request assistance directly even if the score does not meet the threshold score. For example, the user may utter a keyword such as "assistance" or "live support" or click on an assistance button. In either case, if the user requests, the support routing module proceeds to step 312. Otherwise, the method 300 terminates.

At step 312, the support routing module selects a support agent to assist the user based on the score. For example, the support routing module may compare the score to a mapping to determine baseline levels of one or more attributes. The support routing module compares the baseline levels to agent profiles to identify a set of agents who can assist the user. The support routing module can select a support agent from the set based on a number of customers waiting in a corresponding agent queue for the agent.

Figure 4:
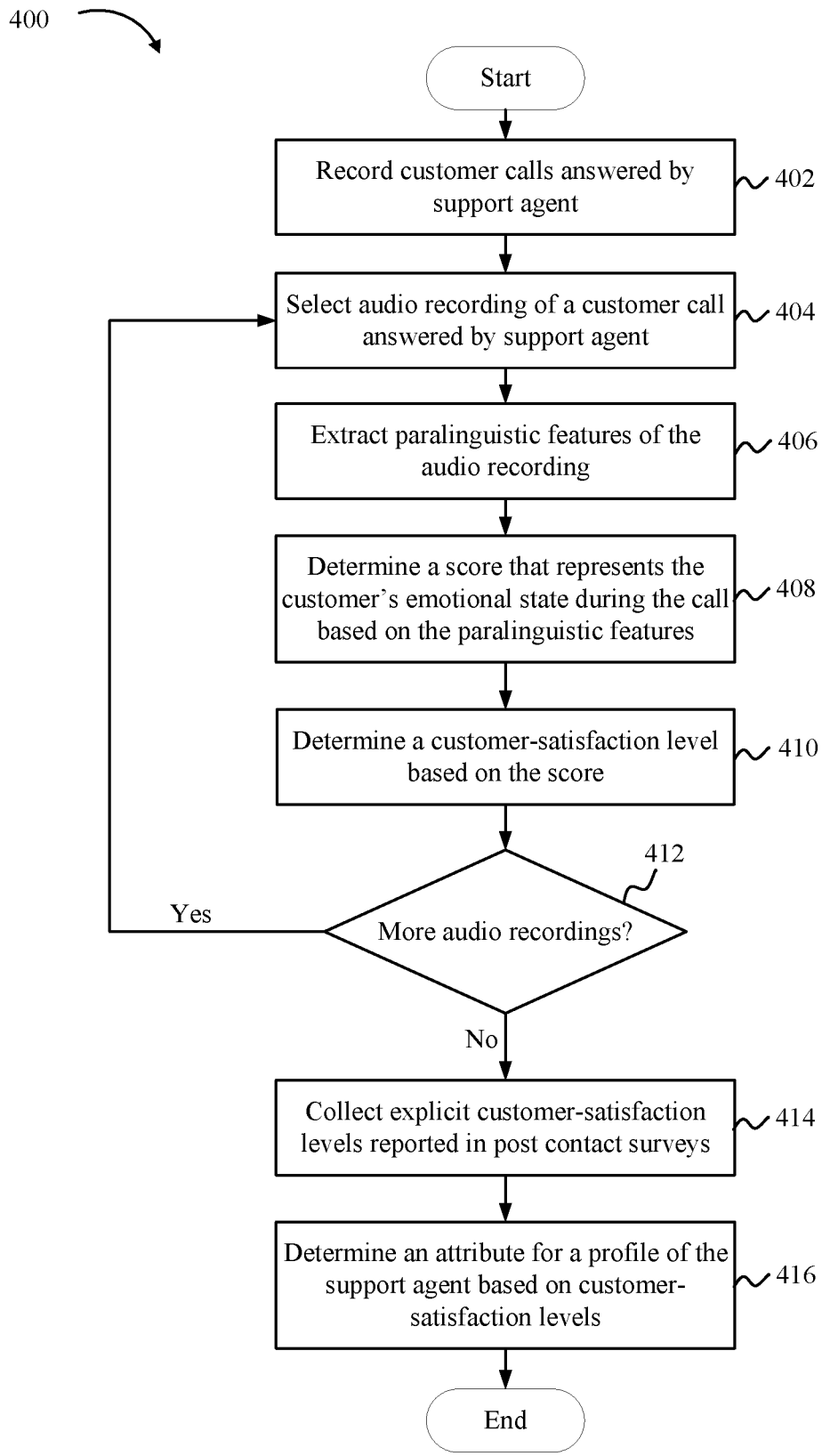
FIG. 4 illustrates a method for implicitly determining how satisfied customers are when assisted by a support agent, according to one embodiment.

FIG. 4 illustrates a method 400 for implicitly determining how satisfied customers are when assisted by a support agent, according to one embodiment. At step 402, a recording device records customer calls answered by a support agent for whom the customer-satisfaction attribute is to be determined.

At step 404, an attribute calculator selects an audio recording of a customer call answered by the support agent. At step 406, a feature extractor extracts paralinguistic features from the audio recording. Since both a customer's voice and the support agent's voice may be heard at different points in the audio recording, the feature extractor may be configured to extract the paralinguistic features from portions of the audio recording that include the customer's voice.

At step 408, a predictive model (e.g., a machine-learning model) determines a score that represents the customer's emotional state during the call based on the paralinguistic features. In one example, the score may be a real number range from −1 (representing a very negative emotional state) to 1 (representing a very positive emotional state).

At step 410, a function determines an implicit customer-satisfaction level for the audio recording based on the score. The function may be linear or non-linear. In one example, the score can range from −1 to 1, where −1 indicates a very negative emotional state and 1 represents a very positive emotional state. The customer-satisfaction level can range from $M_1$ (indicating a very low level of customer satisfaction) to $M_2$ (indicating a very high level of customer satisfaction), where $M_1 < M_2$. In this example, the function that defines the customer-satisfaction level based on the score S may be defined as:

$$\tfrac{1}{2} \cdot (M_2 - M_1) \cdot S + M_1 + \tfrac{1}{2} \cdot (M_2 - M_1)$$

Alternatively, the function that defines the customer-satisfaction level based on the score S may be a non-linear and defined as:

$$\tfrac{1}{2} \cdot (M_2 - M_1) \cdot S^3 + M_1 + \tfrac{1}{2} \cdot (M_2 - M_1)$$

Other definitions of the function are also possible.

At step 412, the attribute calculator determines whether there are any additional audio recordings of customer calls answered by the support agent. If there are, steps 404-410 are repeated. Otherwise, the method 400 proceeds to step 414.

At step 414, the attribute calculator collects explicit customer-satisfaction levels reported in post-contact surveys that customers filled out after interacting with the agent.

At step 416, the attribute calculator determines a customer-satisfaction attribute of the support agent based on both the implicit and explicit customer-satisfaction levels. For example, the attribute calculator may define the customer-satisfaction attribute as the mean, median, or mode of the customer-satisfaction levels. The customer-satisfaction attribute is included in a profile for the support agent.

Figure 5:
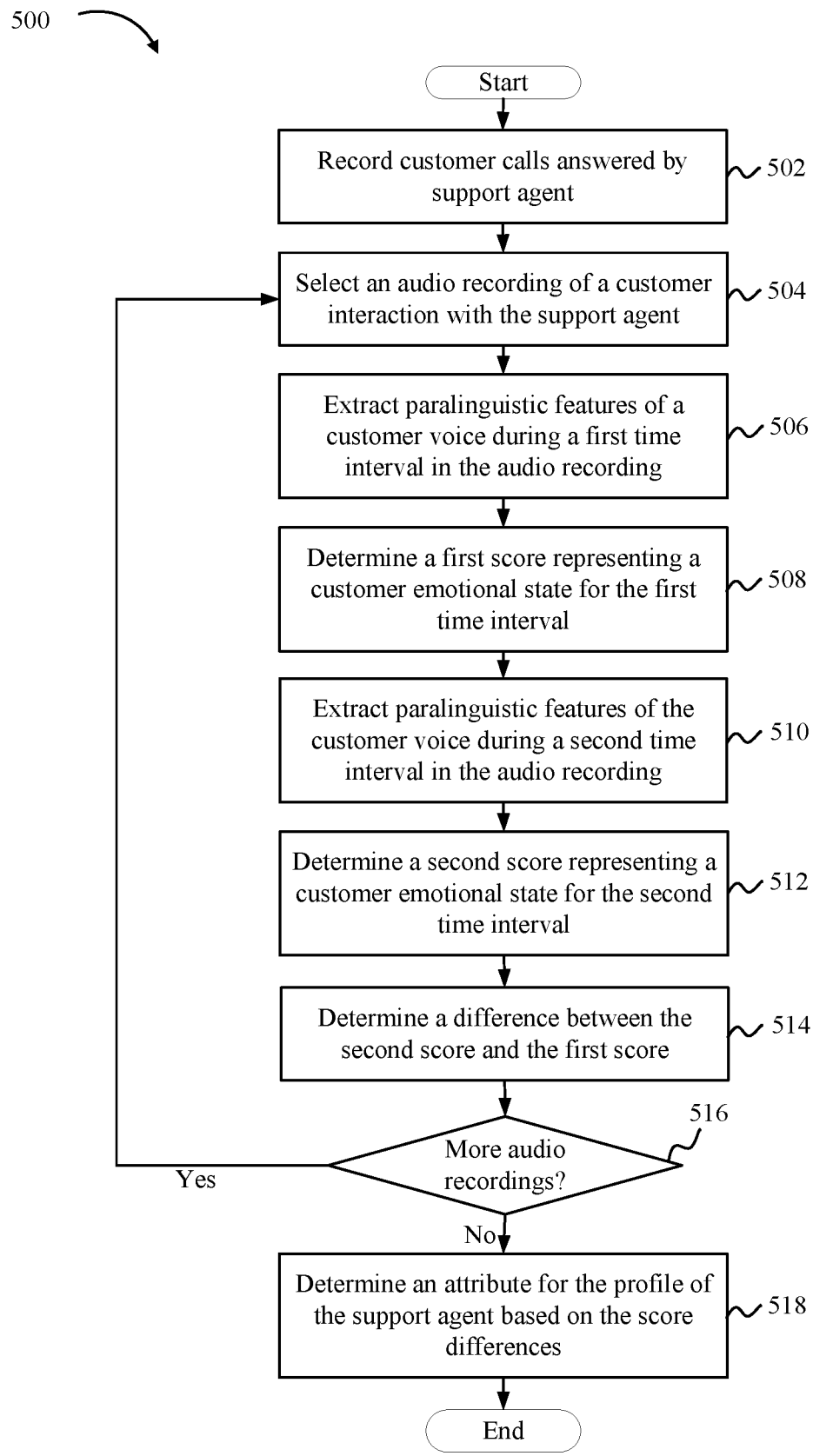
FIG. 5 illustrates a method for determining an attribute measuring how well a support agent improves customer emotional states, according to one embodiment.

FIG. 5 illustrates a method 500 for determining an attribute measuring how well a support agent improves customer emotional states, according to one embodiment. At step 502, a recording device records customer calls answered by a support agent for whom the attribute is to be determined.

At step 504, an attribute calculator selects an audio recording of a customer call answered by the support agent. At step 506, a feature extractor extracts paralinguistic features of a customer voice during a first time interval in the audio recording. In one embodiment, the first time interval can begin at the beginning of the call. The length of the first time interval may be a predefined number of minutes or seconds. Alternatively, the length of the first time interval may be a predefined percentage of the total length of the call.

At step 508, a predictive model (e.g., a machine-learning model) determines a first score that represents the customer's emotional state during the first time interval based on the paralinguistic features extracted during the first time interval. In one example, the score may be a real number ranging from −1 (representing a very negative emotional state) to 1 (representing a very positive emotional state).

At step 510, a feature extractor extracts paralinguistic features of a customer voice during a second time interval in the audio recording. In one embodiment, the second time interval can end at the end of the call. The length of the second time interval may be a predefined number of minutes or seconds. Alternatively, the length of the second time interval may be a predefined percentage of the total length of the call. In one embodiment, the second time interval does not overlap with the first time interval.

At step 512, the predictive model (e.g., a machine-learning model) determines a second score that represents the customer's emotional state during the second time interval based on the paralinguistic features extracted during the second time interval. At step 514, the attribute calculator determines a difference between the second score and the first score. For example, the attribute calculator may subtract the first score from the second score to determine the difference.

At step 516, the attribute calculator whether there are any additional audio recordings of customer calls answered by the support agent. If there are, steps 504-514 are repeated. Otherwise, the method 500 proceeds to step 518.

At step 518, the attribute calculator determines an attribute of the support agent based on score differences. For example, the attribute calculator may define the attribute as the mean, median, or mode of the score differences. The attribute is included in a profile for the support agent.

Figure 6:
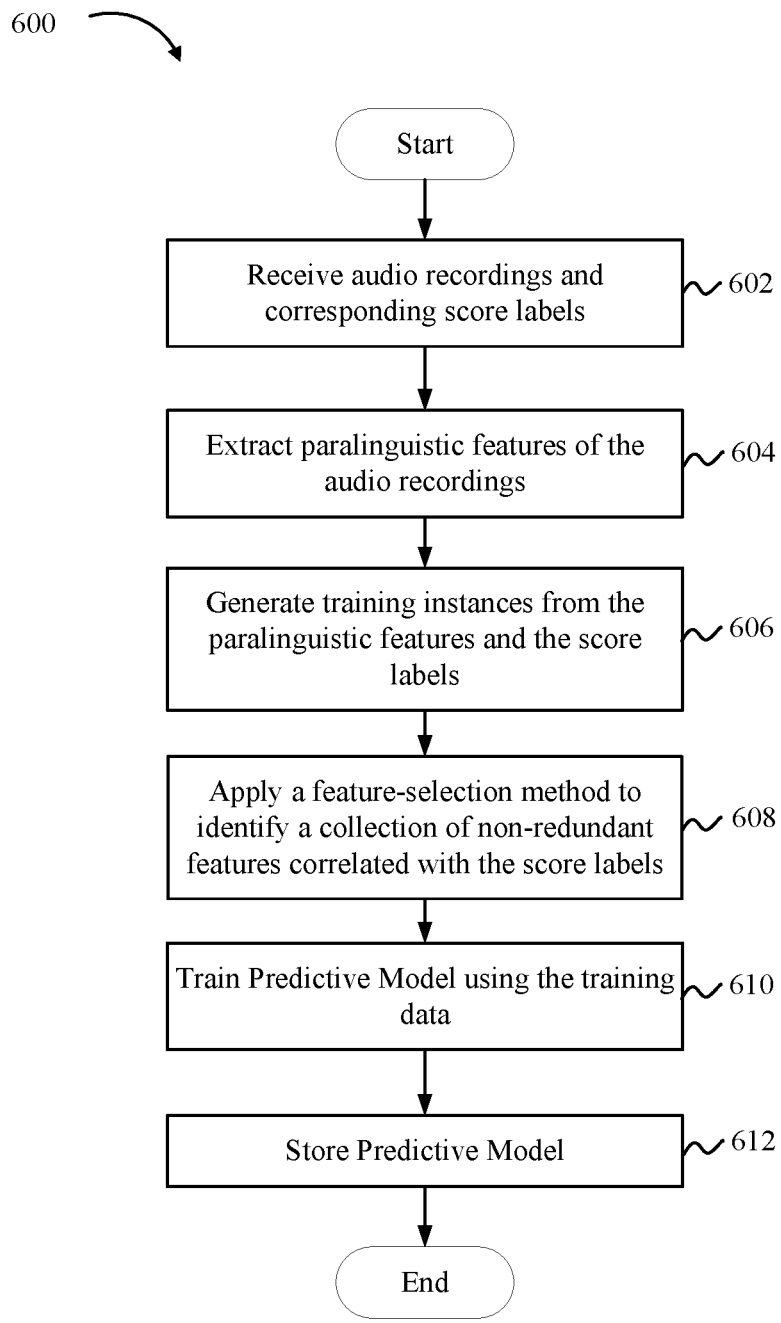
FIG. 6 illustrates a method for training a predictive model, according to one embodiment.

FIG. 6 illustrates a method 600 for training a predictive model to predict an emotional state from paralinguistic features of spoken utterances, according to one embodiment. At step 602, a model creator receives audio recordings and corresponding score labels measuring emotional states.

At step 604, the model creator extracts a set of paralinguistic features from each audio recording. At step 606, the model creator generates training instances from the features and the score labels. Each training instance comprises the set of features extracted from the corresponding audio recording and the score label of the corresponding to the audio recording. The score label represents the value (e.g., of the target variable) that the predictive model will be trained to predict based on the set of features.

At step 608, the model creator applies a feature-selection method to identify a collection of non-redundant paralinguistic features that are correlated with the scoring labels. Some feature-selection techniques that the model may apply include the Las Vegas Filter (LVF), Las Vegas Incremental (LVI), Relief, Sequential Forward Generation (SFG), Sequential Backward Generation (SBG), Sequential Floating Forward Search (SFFS), Focus, Branch and Bound (B & B), and Quick Branch and Bound (QB&B) techniques.

There are several reasons why it is useful to identify the collection of non-redundant paralinguistic features correlated with the scoring labels before training the predictive model. For example, some features extracted at step 604 may not be appreciably correlated to the scoring labels that the predictive model is designed to predict. Irrelevant features can cause overfitting some predictive models. In addition, one feature may be so closely correlated with another feature that it would be redundant to use both for training. Furthermore, redundant features can blunt the accuracy of some distance metrics used in instance-based (nearest neighbor) models. Also, when irrelevant or redundant features are present in training data, most predictive models take longer to train.

In general, the number of features included in the collection should be small relative to the total number of training instances in the training data. In some embodiments, the number of features selected for the collection can be at least two orders of magnitude smaller than the number of training instances in the training data.

At step 610, the model creator trains the predictive model to predict the target variable (i.e., the score or scores measuring an emotional state) based on the collection of non-redundant paralinguistic features. The way the training is accomplished depends on which type of machine-learning model used as the predictive model. A neural network, for example, iteratively adjusts weights within layers of network nodes based on an error terms defined by the back-propagation technique. Depending on the learning rate and the number of layers, the neural network may be trained for several hundred epochs (i.e., iterations through the entire set of training data).

At step 612, the model creator stores the predictive model for future use. The predictive model is stored in a format that is accessible to a support routing module.

Figure 7:
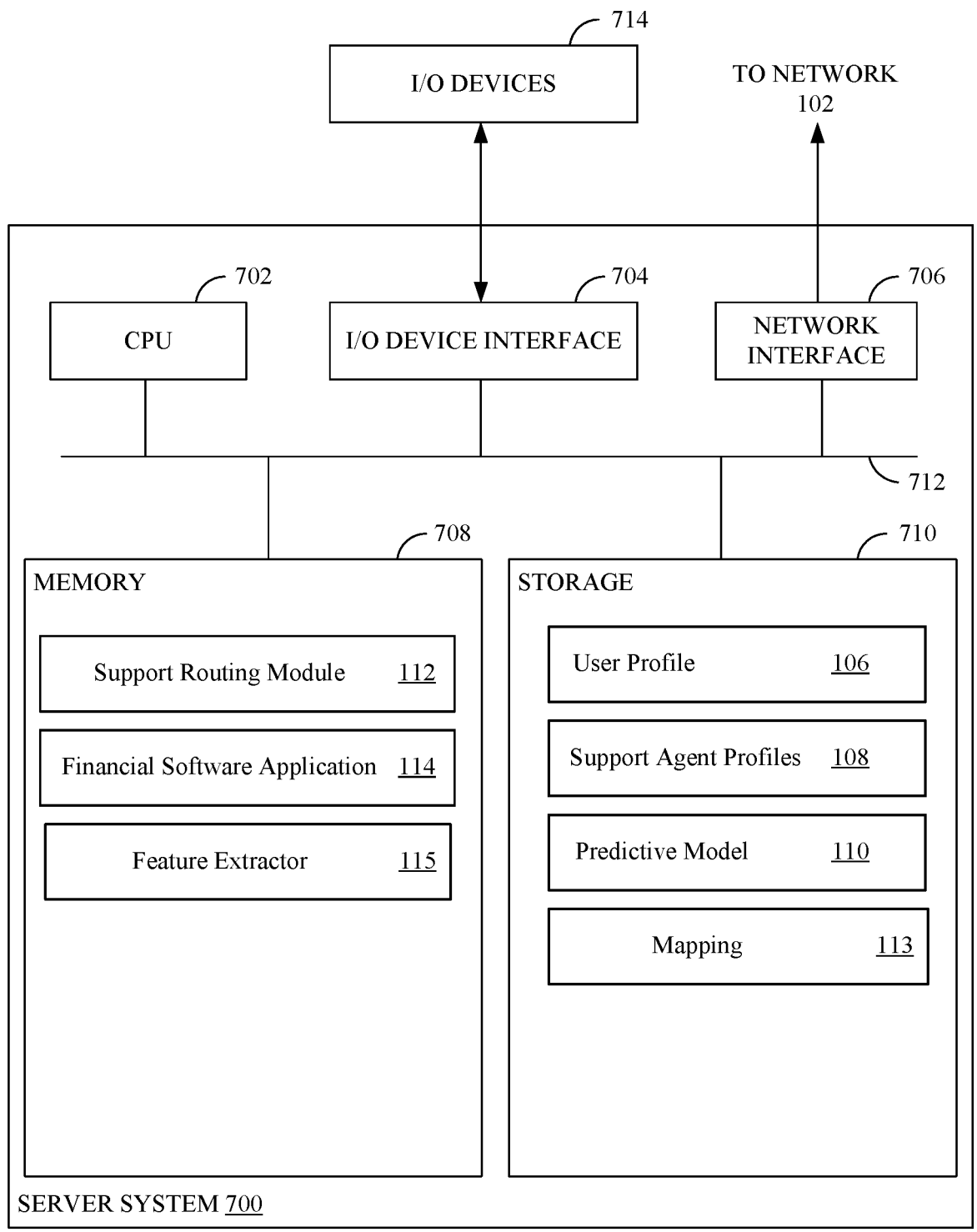
FIG. 7 illustrates a targeted marketing system that provides targeted advertisements, according to one embodiment.

FIG. 7 illustrates a server system 700 that routes users to support agents based on paralinguistic features of user audio input, according to one embodiment. As shown, the server system 700 includes, without limitation, a central processing unit (CPU) 702, one or more I/O device interfaces 704 which may allow for the connection of various I/O devices 714 (e.g., keyboards, displays, mouse devices, pen input, etc.) to the server system 700, network interface 706, a memory 708, storage 710, and an interconnect 712.

CPU 702 may retrieve and execute programming instructions stored in the memory 708. Similarly, the CPU 702 may retrieve and store application data residing in the memory 708. The interconnect 712 transmits programming instructions and application data among the CPU 702, I/O device interfaces 704, network interface 706, memory 708, and storage 710. CPU 702 can represent a single CPU, multiple CPUs, a single CPU having multiple processing cores, and the like. Additionally, the memory 708 represents random access memory. Furthermore, the storage 710 may be a disk drive. Although shown as a single unit, the storage 710 may be a combination of fixed or removable storage devices, such as fixed disc drives, removable memory cards or optical storage, network attached storage (NAS), or a storage area-network (SAN).

As shown, memory 708 includes support routing module 112, financial software application 114, and feature extractor 115. As shown, storage 710 includes user profile 106, support agent profiles 108, predictive model 110, and mapping 113.

The financial software application 114 receives audio input from a user. The feature extractor 115 extracts paralinguistic features from the audio input. The paralinguistic features are provided as input to the predictive model 110. Based on the paralinguistic features, the predictive model 110 determines a score that represents a current emotional state of the user. Based on the score, the support routing module 112 provides a prompt for the user to request assistance from a support agent. When the user accepts the prompt, the support routing module 112 compares the score to the mapping 113 to determine baseline attribute levels for a support agent to assist the user. The support routing module 112 compares the baseline attribute levels to the support agent profiles 108 to identify a support agent to assist the user. The support routing module 112 adds the user to an agent queue for a support agent that meets the baseline attributes.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method comprising:
retrieving a set of audio recordings of each interaction between a support agent and each user in a set of users;
extracting, from each audio recording, a set of paralinguistic features associated with each user;
generating, based on the set of paralinguistic features, a score for each user that represents an emotional state of the user during the interaction with the support agent;
determining an implicit customer-satisfaction level for each user interacting with the support agent based on the score;
obtaining a set of explicit customer-satisfaction levels from the set of users corresponding to the interaction with the support agent;
determining a customer-satisfaction attribute of the support agent based on each implicit customer-satisfaction level and the set of explicit customer-satisfaction levels; and
generating a support agent profile for the support agent including the customer-satisfaction attribute.

2. The computer-implemented method of claim 1, further comprises: providing a survey to each user interacting with the support agent.

3. The computer-implemented method of claim 2, wherein the explicit customer-satisfaction level is based on the survey completed by the user after interacting with the support agent.

4. The computer-implemented method of claim 1, wherein the customer-satisfaction attribute is an average of each customer-satisfaction level.

5. The computer-implemented method of claim 1, wherein determining the implicit customer-satisfaction level is based on a function.

6. The computer-implemented method of claim 1, wherein the score is generated by a predictive model trained to predict the emotional state of the user based on a set of training audio data and corresponding labels representing the score associated with each training audio data.

7. The computer-implemented method of claim 1, wherein extracting the set of paralinguistic features includes identifying each portion of the audio recording the user is speaking.

8. A system, comprising:
a processor; and
a memory storing one or more applications, which, when executed on the processor, perform an operation, the operation comprising:
retrieving a set of audio recordings of each interaction between a support agent and each user in a set of users;
extracting, from each audio recording, a set of paralinguistic features associated with each user;
generating, based on the set of paralinguistic features, a score for each user that represents an emotional state of the user during the interaction with the support agent;
determining an implicit customer-satisfaction level for each user interacting with the support agent based on the score;
obtaining a set of explicit customer-satisfaction levels from the set of users corresponding to the interaction with the support agent;
determining a customer-satisfaction attribute of the support agent based on each implicit customer-satisfaction level and the set of explicit customer-satisfaction levels; and
generating a support agent profile for the support agent including the customer-satisfaction attribute.

9. The system of claim 8, further comprises: providing a survey to each user interacting with the support agent.

10. The system of claim 9, wherein the explicit customer-satisfaction level is based on the survey completed by the user after interacting with the support agent.

11. The system of claim 8, wherein the customer-satisfaction attribute is an average of each customer-satisfaction level.

12. The system of claim 8, wherein determining the implicit customer-satisfaction level is based on a function.

13. The system of claim 8, wherein the score is generated by a predictive model trained to predict the emotional state of the user based on a set of training audio data and corresponding labels representing the score associated with each training audio data.

14. The system of claim 8, wherein extracting the set of paralinguistic features includes identifying each portion of the audio recording the user is speaking.

15. A non-transitory computer-readable storage medium containing instructions that, when executed by one or more processors, perform an operation, the operation comprising:
retrieving a set of audio recordings of each interaction between a support agent and each user in a set of users;
extracting, from each audio recording, a set of paralinguistic features associated with each user;
generating, based on the set of paralinguistic features, a score for each user that represents an emotional state of the user during the interaction with the support agent;
determining an implicit customer-satisfaction level for each user interacting with the support agent based on the score;
obtaining a set of explicit customer-satisfaction levels from the set of users corresponding to the interaction with the support agent;
determining a customer-satisfaction attribute of the support agent based on each implicit customer-satisfaction level and the set of explicit customer-satisfaction levels; and
generating a support agent profile for the support agent including the customer-satisfaction attribute.

16. The non-transitory computer-readable storage medium of claim 15, further comprises: providing a survey to each user interacting with the support agent.

17. The non-transitory computer-readable storage medium of claim 16, wherein the explicit customer-satisfaction level is based on the survey completed by the user after interacting with the support agent.

18. The non-transitory computer-readable storage medium of claim 15, wherein the customer-satisfaction attribute is an average of each customer-satisfaction level.

19. The non-transitory computer-readable storage medium of claim 15, wherein determining the implicit customer-satisfaction level is based on a function.

20. The non-transitory computer-readable storage medium of claim 15, wherein the score is generated by a predictive model trained to predict the emotional state of the user based on a set of training audio data and corresponding labels representing the score associated with each training audio data.

* * * * *